United States Patent [19]

Ehrenreich

[11] 4,119,189
[45] Oct. 10, 1978

[54] REINFORCED CARBON AND GRAPHITE ARTICLES

[75] Inventor: Leo C. Ehrenreich, Buffalo, N.Y.

[73] Assignee: The Carborundum Company, Niagara Falls, N.Y.

[21] Appl. No.: 215,161

[22] Filed: Jan. 3, 1972

Related U.S. Application Data

[62] Division of Ser. No. 722,158, Apr. 18, 1968, Pat. No. 3,672,936.

[51] Int. Cl.$^2$ .................... C23C 9/06; B44D 1/46; F16D 13/60
[52] U.S. Cl. .................... 192/107 M; 188/251 A; 427/228; 428/368; 428/371; 428/408
[58] Field of Search ............. 192/107 M; 188/251 A; 427/227, 228; 428/408, 368, 371

[56] References Cited

U.S. PATENT DOCUMENTS

| | | | |
|---|---|---|---|
| 3,174,895 | 3/1965 | Gibson et al. | 428/286 |
| 3,416,944 | 12/1968 | Pirrung | 427/228 |
| 3,421,913 | 1/1969 | Falcettoni | 192/107 M X |
| 3,462,289 | 8/1969 | Rolh et al. | 427/228 |
| 3,657,061 | 4/1972 | Carlson | 428/408 X |

OTHER PUBLICATIONS

Carborundum, CARB-1-TEX, Bulletin 112, 6 pp., dated 1965.

*Primary Examiner*—Benjamin W. Wyche
*Attorney, Agent, or Firm*—David E. Dougherty; Raymond W. Green

[57] ABSTRACT

A reinforced carbon article which comprises a carbon fiber shape bonded by a carbon binder and having incorporated within said article a friction modifier, e.g., the in situ reaction product of carbon and a boron containing additive which comprises a material selected from the group consisting of boron, boron nitride, boron silicide and refractory metal borides; and a process of making such an article which comprises forming a carbon fiber shape, dispersing a boron containing additive within at least a portion of said carbon fiber shape, impregnating the carbon fiber shape with a carbonizable binder, and heating the shape to carbonize the binder and to form in situ the reaction product of carbon and the boron containing additive.

10 Claims, No Drawings

4,119,189

REINFORCED CARBON AND GRAPHITE ARTICLES

This is a division of copending application Ser. No. 722,158, filed Apr. 18, 1968 and now U.S. Pat. No. 3,672,936.

BACKGROUND OF INVENTION

This invention relates to reinforced carbon and graphite articles and more particularly to reinforced carbon and graphite articles having improved physical properties and increased oxidation resistance at high temperatures as compared to conventional reinforced carbon and graphite articles.

Reinforced carbon and graphite articles have found many applications in modern industry, particularly in the aerospace and aviation field, where resistance to corrosion, high temperature, thermal shock and excellent wear characteristics are required of the material to be used. In this connection articles consisting essentially of carbon or graphite fibers bound by a carbon or graphite matrix into integral bodies have been found to be exceedingly useful. Highly satisfactory reinforced carbon and graphite articles and the method of producing them is disclosed by Rohl and Robinson in application Ser. No. 478,033 filed Aug. 5, 1965, now U.S. Pat. No. 3,462,289, entitled Process for Producing Reinforced Carbon and Graphite Bodies. Another method for producing laminated graphite articles is disclosed in U.S. pat. No. 3,174,895 to Gibson et al.

Reinforced carbon and graphite bodies are subject to delamination when placed under high stress. Furthermore, when subjected to high temperatures in the presence of oxygen the useful life of such bodies is shortened due to the oxidation of the carbon and graphite in the reinforcing fibers and in the binder.

Accordingly it is an object of this invention to provide a reinforced carbon or graphite article having improved oxidation resistance and increased strength characteristics as compared to conventional reinforced carbon and graphite articles.

It is another object of this invention to provide an improved reinforced carbon or graphite article having incorporated therein the in situ reaction product of carbon and a boron containing additive whereby the strength characteristics and oxidation resistance of the article are enhanced.

These and other objects and advantages of this invention will be apparent upon a consideration of the following description of the embodiments described below and the novel features thereof will be particularly pointed out hereinafter in connection with the appended claims.

In the course of the following description and in the claims appended hereto the composition of reinforced bodies made in accordance with the present invention will be referred to as being carbon. It will be noted, however, that by the use of the word carbon applicant intends to refer to carbon in all its forms, including graphite.

SUMMARY OF INVENTION

Applicant has discovered, in accordance with the present invention, that by the incorporation of the in situ reaction product of carbon and a boron containing additive in at least a portion of a reinforced carbon body that the strength and oxidation resistant properties of said body are thereby substantially enhanced and that such bodies will retain high strength at temperatures on the order of 1000° C and will have an increased useful life even though exposed to such temperatures. In addition applicant has discovered that by the incorporation of the in situ reaction product of carbon and a boron containing additive in reinforced carbon bodies in wear rate of such bodies is improved over reinforced carbon bodies which do not incorporate such in situ reaction products and that in many cases the coefficient of friction of the reinforced carbon article is substantially reduced from the coefficient of friction of conventional reinforced carbon articles.

Although it is not fully understood, a reaction product of carbon and the boron containing additive is formed in situ within the reinforced carbon articles made in accordance with this invention. The exact nature of this reaction product or extent to which it is formed has not been ascertained. There is evidence, however, which shows that at least a portion of the boron of the additive reacts with the carbon of the binder and of the fiber in the area surrounding the additive to form in situ boron carbide. In addition when using a refractory metal boride as the boron containing additive there is also formed some refractory metal carbide. The substantial improvement in oxidation resistance of bodies made in accordance with this invention can also be said to be due to the presence of at least trace amounts of elemental boron which acts as an inhibitor to prevent the oxidation of carbon.

The boron containing additives used in this invention are selected from the group consisting of boron and boron compounds, the non-boron element of which forms stable carbides in the presence of carbon or is fugitive. For the purpose of this invention it is preferred to use as an additive the refractory metal borides, boron nitride or boron silicide as well as elemental boron. The non-boron element of the refractory metal borides and boron silicide form stable carbides which enhance the properties of articles made according to this invention. The nitrogen of the boron nitride involved in forming the in situ reaction product is readily removed from the body during the production thereof. The refractory metal borides includes the borides of titanium, zirconium, hafnium, vanadium, niobium, tantalum, chromium, molybdenum and tungsten.

By the term "at least a portion it is said body" it is meant that the boron containing additive may be dispersed uniformly throughout a reinforced carbon body or may be dispersed only in certain selected portions thereof, such as for example a body portion that is to be exposed to high temperatures or oxidation. An example of such a body would be in an aircraft brake system wherein the braking portion comprises a series of juxtaposed reinforced carbon discs which are positioned within the hub and about the wheel axle wherein a plurality of the discs are affixed to the hub and are rotating about the axle when the wheel is rotating and a plurality of the discs are affixed to the axle and are stationary. The rotating and stationary discs are alternately juxtaposed. In such a system a pressure means is applied to the discs to squeeze them together whereby the disc faces are brought into contact with each other and braking is thereby effected. In such a brake system the outer periphery of the rotating discs and the inner periphery of the stationary discs are subjected to relatively high temperatures in the presence of oxygen. Accordingly the use of a boron containing additive in these areas subjected to oxidation at high temperature is highly effective in increasing life of the brake discs.

It is preferred that carbon articles be produced in accordance with this invention by forming carbon fibers into shape, pressure impregnating a carbonizable binder into said fibrous shape, and firing said impregnated shape at sufficient temperature in an inert atmosphere to carbonize the binder thereby causing the fibers to be bound into an integral body with a carbon binder. The impregnating and carbonizing steps are repeated a number of times as will be hereinafter described more fully, until the density of the article is at the desired level, normally 1.4 g/cc and higher. The carbon fiber shapes are produced by building up layers of carbon cloth, or by wrapping carbon fibers around mandrels, or by randomly disposing or directionally orienting carbon fibers in a mold. In the examples described herein the fiber shapes are produced by building up a desired number of layers of woven carbon fabric so that the individual layers are axially juxtaposed with respect to the adjacent layers.

In the practice of this invention the boron containing additive is dispersed in the fiber shape in the form of finely divided particles between the fiber layers as the fibrous shape is being produced. Finely divided particles may be dispersed uniformly throughout the individual layers thereby to provide a body having the additive uniformly dispersed therethrough or may be dispersed in only a portion of the fiber shape as described in more detail hereinafter. Additionally, however, the carbon fibers of the bodies made by this invention can be pretreated by a coating of the boron containing additive on the fibers prior to forming the fibrous shape. When dispersed as finely divided particles, it is preferred that the boron containing additive have a particle size of 250 microns and smaller.

The amount of boron containing additive dispersed in any portion of the carbon fiber shape should not exceed about 7 percent by volume of that portion in the finished article. Excellent results have been achieved when the fiber shape has dispersed therein about 3.5 volume percent of the boron containing additive. It has been found that when the proportion of boron containing additive is raised above 7 vol.% that there is little or no additional increase in strength or oxidation resistance of the body and that additionally there is a tendency to weaken the carbon bond.

Reinforced carbon articles made in accordance with this invention can be produced in a variety of shapes and configurations consistent with the manufacture of reinforced carbon bodies and as such may be used as an ablative material in nose cones and aircraft skins, rocket nozzles, molds for hot pressing materials, boats for high temperature metallurgical operations and containers for highly corrosive materials. In addition the coefficient of friction of carbon articles can be altered so that an article having a substantially lower coefficient of friction than conventional reinforced carbon articles can be produced for certain applications such as for example in journals or bearings where a low coefficient of friction is highly desired. A coefficient of friction higher than that normally found in conventional reinforced carbon bodies is achieved when, as the boron containing additive, a boride of tungsten is incorporated in the body. This material has been found to have high utility in brake applications since, in addition to the increased oxidation resistance and physical characteristics achieved by bodies made in accordance with this invention, articles containing tungsten borides require a minimum break-in time for friction brake applications as contrasted to conventional reinforced carbon materials.

DESCRIPTION OF PREFERRED EMBODIMENTS

The following specific examples illustrate more clearly the exact manner in which the process of the present invention can be carried out, although the invention is not to be construed as being limited to the particular articles set forth in the examples.

EXAMPLE 1

7.5 ounce plain weave carbon cloth was cut into a plurality of sheets having a 10½ inch diameter. A fiber shape ½ inch thick was produced by vertically stacking in axial alignment 64 sheets of the carbon fabric. 1.15 gms of finely divided boron was uniformly dispersed over each sheet making a total of 73.6 g of finely divided boron uniformly dispersed throughout the fiber shape. This amount is equivalent to 3.5 percent by volume of the finished article. The elemental boron had an average particle size of about 12 microns.

The fibrous shape was placed under slight compression and placed in an autoclave which was evacuated to a pressure of less than 3 millimeters of mercury. The autoclave was then pressurized to 100 psi and the shape impregnated with a carbonaceous resin mixture consisting of 50 wt.% furan and 50 wt.% furfural catalyzed with 3% maleic anhydride. Impregnation was carried out for about 1 hour at which point the resin impregnated shape was removed from the autoclave, pressed to a thickness of ⅜ inch, replaced in the autoclave and heated to a temperature of about 150° C at a pressure of 100 psi for 8 hours in order to cure the resin. After curing, the impregnated shape was removed from the autoclave and placed in a baking furnace where it was baked to a temperature of 800° C for 48 hours in a protective atmosphere of nitrogen in order to carbonize the resin. At the completion of the baking cycle the shape was reimpregnated and rebaked an additional two times as described above and then subjected to a high temperature bake at 1650° C. The body was then reimpregnated and baked an additional two cycles making a total of five impregnating and baking cycles. The finished shape was then machined down to a disc 8¾ inch in diameter and ½ inch thick. The density of the final product was 1.43 g/cc.

For comparative testing purposes a disc consisting essentially of carbon reinforcing fibers and a carbon binder was made in precisely the same manner except that the comparison disc contained no additive. Such a disc represents a conventional reinforced carbon article.

Both discs were subjected to tests to determine the physical characteristics and oxidation resistance. Tensile strength was run in accordance with ASTM D-638, flexural strength was run in accordance with ASTM D-790, compressive strength, parallel to lamination, was run in accordance with ASTM D-695. Resistance to oxidation was determined by first weighing and then heating a disc in a nitrogen atmosphere to 1000° C, holding it at this temperature for a period of 10 minutes, and removing the hot disc and allowing it to cool in air. The cycle was carried out 20 times. At completion the disc was weighed to determine weight loss and subjected to compressive testing to determine the degradation of compressive strength. The results are set forth in Table A below.

TABLE A

Results of Physical and Oxidation Testing of Reinforced Carbon Bodies

| | Material Tested | |
|---|---|---|
| | Conventional Disc | Carbon Disc Boron Added |
| Flexural Strength | 12,000 psi | 17,700 psi |
| Compressive Strength | 10,000 psi | 20,650 psi |
| Oxidation Tests | | |
| % wt. loss | 27% | 6% |
| % compressive strength degradation | 45% | 20% |
| Dynamic Coefficient of Friction (tested material against conventional reinforced carbon) | 0.25 | 0.075 |

From a consideration of Table A above it can be seen that the flexural and compressive strengths of the body containing the boron additive are greatly increased over the strengths for the conventional reinforced carbon body. The body containing the boron additive is considerably stronger and less subject to delamination when placed under high stress. It can also be seen that the oxidation resistance of the body, as measured by its weight loss after oxidation and its compressive strength degradation, is considerably better than for the conventional reinforced carbon body. In addition the dynamic coefficient of friction, which is a measure of the frictional resistance obtained when a body composed of the material being tested is moved over conventional reinforced carbon, is considerably lower for the material containing the boron additive than that of the conventional reinforced carbon. Such a low coefficient of friction is highly desirable in applications where moving parts are involved such as in bearings, journal sleeves and the like.

The following example illustrates other boron containing additives which are useful in producing bodies in accordance with the present invention.

EXAMPLES 2-5

Reinforced carbon discs incorporating the reaction product of carbon and boron containing additives were produced in the manner of the disc of Example 1. In all cases the boron containing additive was added to the fiber shape in an amount equal to 3.5 vol.% of the finished article. Individual discs were produced which contained as a boron containing additive respectively; titanium diboride, zirconium diboride, ditungsten monoboride and a composition comprising 85-95 mol % zirconium diboride and 5-15 mole % molybdenum disilicide and identified as Boride "Z". The boron containing additives were finely divided as in Example 1. In all cases the boron containing additive was uniformly dispersed between plies of carbon cloth as in Example 1 except that the actual grams of additive was adjusted according to the density of the additive. Listed in Table B below are the compressive strengths and dynamic coefficients of the discs containing various additives according to this invention.

TABLE B

Compressive Strengths and Dynamic Coefficients of Friction of Reinforced Carbon Bodies Incorporating Boron Containing Additives

| Boron Containing Additive | Compressive Strength (parallel to laminations) | Dynamic Coefficient of Friction |
|---|---|---|
| $TiB_2$ | 16,500 psi | 0.08 |
| $ZrB_2$ | 15,000 psi | 0.05 |
| Boride "Z" | 15,800 psi | 0.13 |
| $W_2B$ | 13,200 psi | 0.28 |

It should be noted from Table B above that the dynamic coefficient of friction for all of the bodies except that having ditungsten boride added were lower than the coefficient of friction of conventional reinforced carbon and consequently are suitable for use where low wear rate and low coefficient of friction are desired.

Special note should be taken of the body containing the reaction product of carbon and ditungsten boride which showed an increase in dynamic coefficient of friction. Such a body is useful in applications where high coefficient of friction is desired and where oxidation resistance and resistance to high temperature is desired. Such an application would be for example in aircraft brake systems. The use of tungsten boride additives in bodies produced in accordance with this invention results in a finished article requiring little or no break-in period for high friction applications while at the same time having the improved oxidation and the increased physical characteristics of reinforced carbon bodies incorporating other boron containing additives.

EXAMPLE 6

A reinforced carbon disc having an overall diameter of 8¾ inches, a thickness of ½ inch and a peripheral portion incorporating the in situ reaction product of carbon and boron was produced as follows.

Plain weave carbon cloth of Example 1 was cut into sheets having a diameter of 10¼ inches. A carbon fiber shape was produced as in Example 1 by placing 64 of the carbon sheets in axial juxtaposition. As each sheet of carbon cloth was positioned in forming the carbon fiber shape a cardboard disc having a diameter of 8½ inches was placed over the center of the sheet leaving the outer 2 inch periphery of the sheet uncovered and 0.59 grams of the finely divided boron of Example 1 was uniformly dispersed over the uncovered peripheral area. The disc was removed from the sheet and another sheet was placed thereon. The procedure for dispersing the boron was repeated for each of the 64 sheets as they were positioned. The total amount of boron dispersed in the outer peripheral portion of the fiber shape was 37.76 grams which is equivalent to 3.5 percent by volume of the peripheral area in the finished article. The fiber shape was compressed to ½ inch in thickness and impregnated and baked in the manner of Example 1. The finished article was machined down to a diameter of 8¾ inches thereby providing a reinforced carbon disc having a ¼ inch wide peripheral portion incorporating the in situ reaction product of carbon and boron and an 8¼ inch diameter center portion consisting essentially of carbon.

It is within the scope of this invention to have the in situ reaction product of carbon and one type of boron containing additive incorporated in a portion of an article while another portion of said article incorporates the in situ reaction product of carbon and a different boron containing additive. Thus, in Example 6 above the center portion of the disc may incorporate the in situ reaction product of carbon and ditungsten boride for example while the peripheral portion incorporates the in situ reaction product of carbon and boron.

As was pointed out earlier in the description of this invention while the examples illustrate reinforced carbon articles it is within the scope of this invention to subject articles incorporating the in situ reaction product of carbon and boron containing additives to an additional graphitizing operation by heating said articles to a temperature of between about 2500° C and about 2800° C thereby to produce reinforced graphite bodies having improved physical characteristics and improved resistance to oxidation as compared to conventional reinforced graphite bodies.

While the invention has been described in connection with specific embodiments thereof, it will be understood that it is capable of further modification, and this application is intended to cover any variations, uses or adaptions of the invention. It will, therefore, be recognized that the invention is not to be considered as limited to the precise embodiments shown and described but is to be interpreted as broadly as permitted by the appended claims.

I claim:

1. A high energy absorbing friction article which is a unified structural member for running in air and which is characterized by light weight and superior heat resistance even at opening temperature as great as 3000° F, the combination of a carbonized filamentary material and a carbonized in situ resin binder material associated with said carbonized filamentary material, said carbonized binder binding said filamentary material into an integral body, whereby to provide superior strength in the friction article, further characterized by a friction modifying amount up to about 48 percent by weight of ditungsten monoboride friction modifier.

2. The friction article of claim 1, wherein the ditungsten monoboride friction modifier is present in amounts up to about 30 percent by weight.

3. A high energy absorbing friction article which is a unified structural member for running in air and which is characterized by light weight and superior heat resistance even at operating temmperature as great as 3000° F, the combination of a carbonized filamentary material and a carbonized in situ resin binder material associated with said carbonized filamentary material, said carbonized binder binding said filamentary material into an integral body, whereby to provide superior strength in the substantially all carbon friction article, further characterized by a friction modifying amount up to about 7 percent by volume of ditungsten monoboride friction modifier.

4. The friction article of claim 3, wherein the ditungsten monoboride friction modifier is present in amounts up to about 3.5% by volume.

5. A friction article comprising carbonized woundup layers of filamentary material and a carbonized in situ resin binder material associated with said carbonized filamentary material said carbonized binder binding said filamentary material into an integral body, said article having an inner periphery and an outer periphery, and having a differential composition such that material of the article adjacent one of said peripheries has different strength and friction properties than the strength and friction properties of material of the article adjacent the other of its peripheries, whereby to provide maximal article mechanical driving strength properties adjacent one periphery and maximal friction material properties adjacent the other.

6. A friction article comprising carbonized layers of filamentary material and a carbonized in situ resin binder material associated with said carbonized filamentary material said carbonized binder binding said filamentary material into an integral body, said article having an inner periphery and an outer periphery, and having a differential composition such that material of the article adjacent one of said peripheries has different strength and friction properties than the strength and friction properties of material of the article adjacent the other of its peripheries, whereby to provide maximal article mechanical driving strength properties adjacent one periphery and maximal friction material properties adjacent the other.

7. A high energy absorbing friction article which is a unified structural member for running in air and which is characterized by light weight and superior heat resistance, the combination of a carbonized filamentary material and a carbonized in situ resin binder material associated with said carbonized filamentary material, said carbonized binder binding said filamentary material into an integral body, whereby to provide superior strength in the friction article, further characterized by a friction modifying amount up to about 48 percent by weight of ditungsten monoboride friction modifier.

8. The friction article of claim 7, wherein the ditungsten monoboride friction modifier is present in amounts up to about 30 percent by weight.

9. A high energy absorbing friction article which is a unified structural member for running in air and which is characterized by light weight and superior heat resistance, the combination of a carbonized filamentary material and a carbonized in situ resin binder material associated with said carbonized filamentary material, said carbonized binder binding said filamentary material into an integral body, whereby to provide superior strength in the substantially all carbon friction article, further characterized by a friction modifying amount up to about 7 percent by volume of ditungsten monoboride friction modifier.

10. The friction article of claim 9, wherein the ditungsten monobromide friction modifier is present in amounts up to about 3.5% by volume.

* * * * *